United States Patent Office 2,862,028
Patented Nov. 25, 1958

2,862,028
MANUFACTURE OF SUCCINIC ACID

Gifford W. Crosby, River Forest, and John B. Braunwarth, Crystal Lake, Ill., assignors to The Pure Oil Company, Chicago, Ill., a corporation of Ohio No Drawing. Application July 11, 1956
Serial No. 597,064

8 Claims. (Cl. 260—537)

This invention is directed to the preparation of aliphatic dibasic acids. It is more specifically concerned with the synthesis of water-soluble aliphatic dicarboxylic acids from nitriles, particularly succinic acid.

Because dicarboxylic acids and their esters are versatile chemicals, finding use as solvents and plasticizers for resins, such as vinyl, modifying agents for alkyd resins, reagents for the preparation of polyester lubricants, lubricant additives, and intermediates for a variety of other chemical synthesis, considerable attention has been directed to their synthesis. Various prior art techniques include the use of reactants such as aliphatic and aromatic hydrocarbons, e. g., benzene, mono- and diolefins, and cycloparaffins; carboxylic compounds, e. g., esters, and carboxylic acids; hydroxy-substituted organic compounds, e. g., cyclohexanol and hydroxy-substituted carboxylic acids and esters; and others. Because organic nitriles are commercially available and economical articles of commerce, several prior art syntheses of organic dibasic acids have employed these materials as starting reagents. (Vide: U. S. Patents 2,306,351; 2,329,433; 2,342,606; 2,440,140.) In U. S. Patent 2,162,971 there is described a process for the preparation of aliphatic polycarboxylic acids by the hydrolysis of polymerized aliphatic nitriles. Because of the polymerization involved, the polycarboxylic acids are of high molecular weight. Furthermore, the reaction mixture contains in addition to dibasic acids a mixture of polyacids containing three or more carboxyl groups.

Because of the nature of the reactions by which nitriles are converted to dinitriles and to dibasic acids in the prior art, straight-chain aliphatic dibasic acids are not produced. Nitrile polymerization gives branched chain di- and polybasic acids, and condensation reactions of materials like acrylonitrile give dinitriles of branched structure or containing other functional groups.

Direct formation of succinic acid by oxidation of aliphatic or cycloaliphatic hydrocarbons occurs only in small yield and this acid is therefore usually produced by other means. One of these methods is by hydrogenation of maleic or fumaric acid available from oxidative splitting of aromatic hydrocarbons. Other methods involve oxidation of intermediates such as butanediol, available from acetylene, of furan derivatives, or of malonic half-esters.

It is therefore a primary object of this invention to prepare low molecular weight, aliphatic dibasic acids.

Additional objects of this invention are to prepare aliphatic dibasic acids of the straight-chain type, and to prepare succinic acid in high yield from mixed unsaturated nitriles obtained by fatty nitrile pyrolysis.

According to this invention, it has been found that saturated aliphatic nitriles may be pyrolyzed to products giving unexpected yields of dibasic acids upon oxidation and hydrolysis. The middle boiling pyrolysis condensate consisted of a mixture of nitriles in the $C_5$–$C_{13}$ range and hydrocarbons in the $C_9$–$C_{17}$ range and contained unsaturation to the extent of nearly 2 double bonds per nitrogen atom. The production of nitriles of a wide range of molecular weights by fatty nitrile pyrolysis is in agreement with Ralston, Journal of the American Chemical Society, 59, 986 (1937), who used somewhat different conditions of temperature and pressure. The high ratio of unsaturation to nitrogen content points to the probability of a substantial concentration of unsaturated nitriles in the product. Nitrogen compounds as well as saturated and unsaturated hydrocarbons made up the by-product boiling below 120° C., but no hydrogen cyanide was produced.

Although the wide-boiling-range nitrile fraction can be converted to a wide-range, dibasic acid mixture by standard reactions, such as ozonolysis and hydrolysis, it has now been found that this same nitrile mixture can be converted to succinic acid in high yield by the method disclosed herein. Valuable, low molecular weight, organic nitrogen compounds may be isolated as by-products from the more volatile pyrolysis products.

To illustrate this invention, 107 gm. of stearo-nitrile was refluxed at atmospheric pressure and the vapors passed in contact with a coil of B&S No. 28 Nichrome wire maintained at 650–700° C. Product boiling below the boiling point of the charge was continuously removed and separated into a gas fraction, volatile liquid fraction, and condensate fraction boiling between 155° and 290° C. The latter pyrolysis product was found to have a bromine number of 107 and a nitrogen content of 5.3% and was obtained in 32% yield. One part of this product was heated with an aqueous solution containing 0.5 part of KOH and 4.2 parts of $KMnO_4$, on a steam bath for three hours. Filtration to remove $MnO_2$ was followed by separation of a hydrocarbon phase and concentration of the aqueous solution. The latter was then refluxed with added KOH until ammonia was no longer evolved, thus completing the hydrolysis of CN groups.

The resulting potassium salts were converted to free acids by percolating their aqueous-alcoholic solution through a 1⅜″ x 12″ column of the hydrogen form of a sulfonic-acid-type ion-exchange resin, Amberlite 1R–105. The effluent solution was distilled to remove alcohol, water and volatile acids, finishing the water removal after addition of toluene. The by-product volatile acids (low fatty acids) amounted to two milliequivalents per gram of cracked nitrile charged to the oxidation process. The above drying procedure left a mixture of toluene and crystalline, insoluble acids which were separated by filtration. The toluene solution contained 0.3 meq. of acid per gram of mixed nitrile charged, representing intermediate range fatty acids. The crystalline product was crude succinic acid amounting to 8 meq. per gram of crude nitrile charged to the oxidation. Calculated neutral equivalent for succinic acid: 59. Found: 62. The molal yield of crude succinic acid based on the nitrile content of the charge to the oxidation process was 100%. Recrystallization from water gave pure succinic acid, and the impure product later isolated from the recrystallization liquor was also shown by paper chromatography to be primarily succinic acid.

In another example, the cracked nitrile intermediate was prepared in a flow system. The reaction zone consisted of the annular space between 20 mm. and 12 mm. Vycor tubes and had a volume of 51 cc. The reaction tube was heated by an electric furnace and the temperature at the midpoint on the outside of the reaction tube was maintained at 600±5° C. Stearonitrile was introduced by means of a capillary feeder at a liquid volume hourly space velocity of 2.5. The product was collected in a series of traps and the liquid portion fractionally distilled under vacuum through a 12″ Vigreaux column. The fraction boiling at 120–290° C., corrected to 1 atmosphere, was found to contain 4.7 w. percent nitrogen and to have a bromine number of 96. This mixture of nitriles and hydrocarbons contained 1.7 double bonds per nitrogen atom. Conversion of stearonitrile was 37 w. percent and the selectively for 120°–290° C. boiling point product was 26 w. percent.

The pyrolysis of the aliphatic nitrile can be carried out using any non-catalytic pyrolytic method that will produce the desired C—C scission. Sufficient heat for the thermal decomposition of the nitrile feed, in addition to being provided by a heated wire, can be obtained with any conventional type of cracking heater including fired tube-still heaters in which reaction is carried out in externally heated tubes, such as those described in Pet. Ref. 28 (8), 143 et seq.; pebble heaters which employ refractory aggregates as the heat transfer means; regenerative furnaces; etc. To provide satisfactory results, the cracking temperature should be about 400 to 700° C. At the lower temperatures, liquid phase differential cracking under pressure may be used, for example 435° C. and 60 p. s. i. g. At higher temperatures, vapor phase reaction in a flow system may be used to advantage. Desirable conversions can be achieved at atmospheric pressure in the 520–700° C. range by suitable variations in space velocity. For example, conversions of 30–40% are obtained at 525° C. and 0.04 l. v. h. s. v., and at 600° C. and 2.5 l. v. h. s. v.

Catalytic cracking of aliphatic nitriles may also be used to produce the desired nitriles which are further processed in accordance with this invention.

It has been found that mixtures containing unsaturated nitriles of five or more carbon atoms can be converted by the method of this invention to a high yield of a single compound, viz., succinic acid, and that this process can be readily carried out in the presence of by-product hydrocarbons occurring along with the pyrolyzed nitriles. It is thus unnecessary to separate the unsaturated nitriles from all the other pyrolysis products, but distillation serves to remove products boiling below valero-nitrile, as well as unchanged fatty nitrile which may be recovered as the distillation residue. Isolation of the succinic acid product from the mixture containing hydrocarbons and other acidic products can be accomplished by known separation techniques. Extraction with water serves to separate the water-soluble acids from hydrocarbons and water-insoluble acids. Distillation of the aqueous solution removes volatile acids with the distillate, leaving the desired water-soluble, nonvolatile dibasic acids.

In oxidizing the pyrolytically cracked aliphatic nitrile, and alkaline oxidizing agent, such as alkaline potassium permanganate, is preferred. The oxidation is carried out under conditions whereby the olefinic linkage is cleaved, with or without prior bond isomerization, to form aliphatic cyanocarboxylic acids. Improved yields of succinic acid from mixed unsaturated nitriles are obtained by means of the alkaline permanganate oxidation. Suitable conditions for effecting the oxidation of the ethenoid portion of the molecule to produce a carboxylic derivative involve addition to the unsaturated nitrile fraction of an aqueous solution containing 5–15% of potassium permanganate and 1–5% of potassium hydroxide. The alkalinity of the mixture increases as the oxidation reaction proceeds and temperatures of 50–100° C. are preferred. The progress of the oxidation reaction during the addition may be followed by observing the discharge of the permanganate color. By-product manganese dioxide may be filtered from the solution when permanganate color persists, or the hydrolysis reaction may be continued under reflux until cyano group conversion is complete as indicated by cessation of ammonia evolution. Nitrile hydrolysis may be speeded up after the oxidation reaction by separation of the maganese dioxide and hydrocarbons, followed by concentration of the aqueous solution to increase the alkali concentration to 5–20%. The resultant alkali salts are converted to the free acid by any conventional acidulation technique. This can also be conveniently effected by ion-exchange techniques wherein hydrogen cation exchangers such as Amerlite IR-105 or IR-120 and others are employed. To acidulate, the alkali salt is passed through a bed of a selected hydrogen cation exchanger, the effluent being concentrated by evaporation before the isolation of acids by crystalilzation. Other acidulation techniques include the addition of at least stoichiometric amounts of acidic media, such as dilute hydrochloric, sulfuric and other strong mineral acid solutions, to the alkali salt solutions to liberate the free acid.

The dibasic acids are recovered as crystalline products by filtration of the acidulated mixture.

Aliphatic nitriles which are processed in accordance with this invention are straight-chain, saturated, aliphatic nitriles having between 5 and 40 carbon atoms per molecule, preferably between 10 and 20 carbon atoms per molecule. Examples of suitable nitriles include but are not limited to stearonitrile. Other suitable nitriles include valeronitrile, capronitrile, caprylonitrile, lauronitrile, myristonitrile, palmitonitrile and mixed nitriles prepared from fatty acid mixtures obtained from oxidation of straight chain petroleum factions, or from hydrolysis of fatty oils.

It is evident that other embodiments in which the pyrolysis, oxidation, and hydrolysis steps of this invention can be modified will be apparent to those skilled in this art.

We claim:

1. The process for preparation of succinic acid which comprises oxidizing at least one unsaturated $C_6$–$C_{13}$ aliphatic nitrile in an aqueous solution of a permanganate containing added alkali, at about 50°–100° C., to produce a reaction mixture containing a substantial yield of a $C_4$ cyanoacid, and hydrolyzing said $C_4$ cyanoacid and recovering the succinic acid thus produced.

2. A process in accordance with claim 1 in which said hydrolysis is carried out using aqueous alkali.

3. A process in accordance with claim 1 in which said added alkali is an alkali metal hydroxide.

4. A process in accordance with claim 1 in which the oxidation is carried out using aqueous potassium permanganate containing added alkali metal hydroxide, and the succinic acid is recovered by aqueous alkaline hydrolysis, followed by acidulation of the product, and crystallization of the succinic acid.

5. A process in accordance with claim 4 in which said oxidation is carried out at 80°–100° C. with an aqueous alkaline solution containing 5–15 wt. percent potassium permanganate and 1–5 wt. percent potassium hydroxide.

6. A process for preparation of succinic acid which comprises oxidizing a mixture of $C_6$–$C_{13}$ unsaturated aliphatic nitriles in an aqueous solution of a permanganate containing added alkali, at about 50°–100° C., to produce a reaction mixture containing a substantial yield of a $C_4$ cyanoacid, and hydrolyzing said $C_4$ cyanoacid and recovering the succinic acid thus produced.

7. A process for the preparation of succinic acid from a liquid mixture of $C_6$–$C_{13}$ nitriles fractionated from a mixture produced by pyrolysis of a $C_{10}$–$C_{20}$ saturated aliphatic nitrile at 400°–700° C., which comprises oxidizing said mixture of nitriles in an aqueous solution of a permanganate containing added alkali, at about 50°–100° C., to produce a reaction mixture containing a substantial yield of a $C_4$ cyanoacid, and hydrolyzing said $C_4$ cyanoacid and recovering the succinic acid thus produced.

8. A process in accordance with claim 7 in which the oxidation is carried out using aqueous potassium permanganate containing added alkali metal hydroxide, and the succinic acid is recovered by aqueous alkaline hydrolysis, followed by acidulation of the product, and crystallization of the succinic acid.

References Cited in the file of this patent

UNITED STATES PATENTS 2,468,436     Fitzpatrick et al.  --------  Apr. 26, 1949

OTHER REFERENCES

Ralston et al.: J. A. C. S., vol. 59, 1937, pp. 986–992.
Groggins: Unit Processes in Organic Synthesis, 2nd edition, 1952, p. 661.